US012586069B2

(12) United States Patent
Edgren

(10) Patent No.: US 12,586,069 B2
(45) Date of Patent: Mar. 24, 2026

(54) METHODS, NETWORK NODE, STORAGE ARRANGEMENT AND STORAGE SYSTEM

(71) Applicant: Jeti Services AB, Lidingö (SE)

(72) Inventor: Johan Edgren, Lidingö (SE)

(73) Assignee: Zenseact AB, Gothenburg (SE)

( * ) Notice: Subject to any disclaimer, the term of this patent is extended or adjusted under 35 U.S.C. 154(b) by 115 days.

(21) Appl. No.: 17/771,562

(22) PCT Filed: Oct. 26, 2020

(86) PCT No.: PCT/SE2020/051031
§ 371 (c)(1),
(2) Date: Apr. 25, 2022

(87) PCT Pub. No.: WO2021/080501
PCT Pub. Date: Apr. 29, 2021

(65) Prior Publication Data
US 2022/0383318 A1      Dec. 1, 2022

(30) Foreign Application Priority Data

Oct. 25, 2019    (SE) .................................... 1951225-0

(51) Int. Cl.
*G06Q 30/06*          (2023.01)
*G06Q 10/08*          (2024.01)
(Continued)

(52) U.S. Cl.
CPC ....... *G06Q 20/4014* (2013.01); *G06Q 10/087* (2013.01); *G06Q 20/3278* (2013.01); *G06Q 20/4016* (2013.01)

(58) Field of Classification Search
CPC ............. G06Q 20/4014; G06Q 10/087; G06Q 20/3278; G06Q 20/4016; G06Q 20/18;
(Continued)

(56) References Cited

U.S. PATENT DOCUMENTS

| 9,911,290 | B1 | 3/2018 | Zalewski et al. | |
| 2008/0055084 | A1* | 3/2008 | Bodin ................... | G06Q 10/087 |
| | | | | 340/8.1 |

(Continued)

FOREIGN PATENT DOCUMENTS

| WO | 2014168955 A2 | 10/2014 | |
| WO | 2019060431 A1 | 3/2019 | |
| WO | WO-2020006553 A1 * | 1/2020 | ............. A47F 9/048 |

OTHER PUBLICATIONS

"RFID System for Enhanced Shopping Experiences", Walter Reade, Nov. 10, 2003, The IP.com Journal (Year: 2003).*

(Continued)

*Primary Examiner* — Duan Zhang
(74) *Attorney, Agent, or Firm* — Weisberg I.P. Law, P.A.

(57)          ABSTRACT

A method for handling one or more items in an item storage in a communication network. The method includes initiating a procedure for handling one or more items in an item storage based on an input related to a user in the communication network, and selecting a position related to an item of the one or more items based on the input. Further, the method includes guiding the user to the selected position via triggering a guiding indication associated with the selected position, and detecting a pattern change in a registered pattern, wherein the pattern change is due to movement of an item associated with the selected position or movement of another item. Upon detection of the pattern change, a confirmation indication is sent for confirming handling of the item back to the user.

10 Claims, 6 Drawing Sheets

(51) Int. Cl.
    *G06Q 10/087*     (2023.01)
    *G06Q 20/32*     (2012.01)
    *G06Q 20/40*     (2012.01)
(58) Field of Classification Search
    CPC .... G06Q 20/308; G06Q 20/326; G06Q 30/06;
              G06Q 50/28; B65G 1/137; B65G
              2203/046
    See application file for complete search history.

(56)           References Cited

U.S. PATENT DOCUMENTS

| | | | |
|---|---|---|---|
| 2015/0012396 A1* | 1/2015 | Puerini | G06V 20/52 |
| | | | 705/28 |
| 2016/0134930 A1* | 5/2016 | Swafford | A47F 5/0068 |
| | | | 725/80 |
| 2018/0114184 A1 | 4/2018 | Brooks et al. | |
| 2019/0012724 A1 | 1/2019 | Chen et al. | |
| 2019/0344965 A1* | 11/2019 | Wilkinson | G07F 11/42 |

OTHER PUBLICATIONS

EPO Communication with Supplementary European Search Report dated Feb. 15, 2024 for Patent Application No. 20879642.5, consisting of 8 pages.
International Search Report and Written Opinion dated Mar. 9, 2021 for International Application No. PCT/SE2020/051031 filed Oct. 26, 2020, consisting of 15-pages.

* cited by examiner

100

METHODS, NETWORK NODE, STORAGE ARRANGEMENT AND STORAGE SYSTEM

CROSS-REFERENCE TO RELATED APPLICATIONS

This application is a Submission Under 35 U.S.C. § 371 for U.S. National Stage Patent Application of International Application No.: PCT/SE2020/051031, filed Oct. 26, 2020 entitled "METHODS, NETWORK NODE, STORAGE ARRANGEMENT AND STORAGE SYSTEM," which claims priority to Swedish Patent Application No.: 1951225-0, filed Oct. 25, 2019, entitled "AUTOMATIC INVENTORY SYSTEM WITH END USER ASSISTANCE," the entireties of both of which are incorporated herein by reference.

TECHNICAL AREA

The present disclosure relates to a method, network node, a storage arrangement and storage system for handling one or more items in an item storage. More in particular, the disclosure relates to the method and the storage arrangement configured to assist a user when handling items in an item storage.

BACKGROUND

Retail stores, warehouses, shelf systems, pick-up points and/or vending machines could save costs by providing automated services which allow customers to make transactions using e-commerce systems and self-servicing. Especially vendors or rental services who offer less common items or where transactions are not very frequent could benefit the most since the costs for keeping staff in such locations are proportionally high.

It has hitherto been difficult to offer self-service transactions to customers i.e. the end-users of the system, because the users often do not know where, and/or how, to pick up purchased items or to drop off returned items. In addition, the users may cause problems to the system if the items are picked up or dropped in an unexpected or non-recognizable manner. The self-service system may lose track of stocks and/or may not be able to finalize transactions, which may in turn frustrate the users and might result in unhappy customers and possibly also in loss of items.

SUMMARY

An object of the present disclosure is therefore to achieve a mechanism for handling items in an item storage, such as retail stores, warehouses, shelf systems, pick-up points and/or vending machines, which mechanism provides an efficient and user friendly manner to handle items compared to known systems and methods.

This object is achieved according to a first aspect by a method performed by a network node such as a computing device, computer server, or similar, for handling one or more items in an item storage in a communication network. The network node initiates a procedure for handling one or more items in an item storage based on an input related to a user in the communication network. The network node selects a position related to an item of the one or more items based on the input, and guides the user to the selected position via triggering a guiding indication associated with the selected position e.g. switching the guiding indication to a first state. The network node detects a pattern change of a registered pattern related to the one or more items in the item storage, wherein the pattern change is due to a movement of the item related to the selected position or movement of another item. Furthermore, upon detection of the pattern change, the network node triggers a confirmation indication for confirming handling of the item back to the user. The user is thus guided, via the guiding indication, to the position where an item is to be picked up or dropped off. As the user interacts with the indicated item, the method detects a change in a previously registered pattern and thereafter sends a confirmation to the user whether the transaction is accepted or not. Thereby, the method makes it possible to automate inventory stock based on a sensor solution which detects pick-up and drop-off of items performed by a user. The communication network may comprise a back-end system having processing power and database storage capability.

According to another aspect of the present disclosure, the input may be detection of presence of the user and/or detection of a selection from a webpage, an application of a user equipment, UE, or similar. The method may be triggered by the user interacting with the storage arrangement of the system, such as by the user arriving at the location or by him/her selecting an item from a webpage or from an application. An application may be a software application, e.g. an Application Programming Interface (API) provided by a back-end system in which the stock and/or one or more user options of the storage arrangement may be presented to the user on a screen.

According to another aspect of the present disclosure, the presence may be set within a range of 0.5 meters. The triggering distance may be used to activate the process of the system upon arrival of the user at the location. But it should also avoid accidental triggering by people who pass in the vicinity of the location of the transaction and who do not intend to interact with the storage arrangement. A distance of 0.5 meters or less, between the user and the storage arrangement, has been determined to be suitable for non-accidental, i.e. intentional, triggering of the storage arrangement.

According to another aspect of the present disclosure, the presence may be detected via radar, card detection, radio frequency identification (RFID), and/or a beacon. As exemplified, radar may be used to detect the presence of a user being in the near vicinity of the storage arrangement. This may be suitable in remote locations or in less populated areas. A user may also be detected by the presence of a card, e.g. a card having a near field communication (NFC) chip. The card may for instance be issued to customers of the commerce system. This is advantageous in that presence of non-customers will not trigger activation of the storage arrangement. The presence of the user may similarly also be detected by RFID and/or a beacon, e.g. a Bluetooth low-energy (BLE) beacon.

According to another aspect of the present disclosure, the method may further comprise identifying the user. In parallel or subsequently with detection of the presence of the user, the user may be identified. The manner of identification depends on the technique adopted for presence detection step of the method. Examples may be face recognition, password identification, UE identity, user identity, data on a chip, etc.

According to another aspect of the present disclosure, the method may further comprise authenticating the user. Simultaneously with, or subsequently to identifying the user, the user may also be authenticated to determine what kind of access and what permissions the user has when transacting with the storage arrangement. For instance, the user may be a customer who is allowed to pick up or drop off an item.

The user may also be an administrator who has permission to rearrange items, change settings, reset the storage arrangement, etc.

According to another aspect of the present disclosure, the detected pattern change may be related to a distance measurement performed by an optical detection, a radio frequency (RF) detection, a radar detection or similar. The pattern is a pattern formed by the items in the item storage. The pattern may be registered by way of distance measurements performed by an optical detection, a RF detection, a radar detection or similar. Different items, arranged in different configurations form the pattern which is registered. If the pattern changes due to pick-up or drop-off of items, the pattern formed by the items will change and the change may be detected by any of the techniques mentioned, or by other suitable techniques known in the art.

According to another aspect of the present disclosure, detecting the pattern change may comprise an additional detection for confirming that the item is a correct item and/or detecting fraudulent behavior. When the pattern change is detected, the change determines what item was picked up or dropped off. This information is compared with user data and inventory data to determine that the transaction was allowed, e.g. that the item corresponds to the user and that the user has requested the item and/or that he or she is authorized to make a transaction with the item. Thereby, fraudulent behavior of a user may be detected.

According to another aspect of the present disclosure, detecting the pattern change may comprise detecting a pick-up of the item and/or a drop-off of the item. The technique for registering the pattern and the pattern change may be used to determine whether an item was picked up or dropped off, such as by determining if a space in the item storage has become empty, or if an item has been placed in an empty space.

According to another aspect of the present disclosure, upon a detection of the pattern change, the network node may perform a charging action associated with the user. Upon determining whether the transaction was a pick-up or the drop-off of an item, and determining what kind of item was involved in the transaction, and what user was involved, a charging action may be performed in which the user pays for the transaction. In other situation situations, the user may be paid or refunded for the transaction, such as when returning an item. The charging action may be performed, for instance using payment information that the user has previously registered with the provider of the item storage or via a card or a handheld unit carried by the user.

According to another aspect of the present disclosure, sending the confirmation indication may comprise triggering the guiding indication to a second state.

The second state of the guiding indication informs the user whether the transaction was accepted/allowed or not. An allowed transaction may be visually and/or audibly indicated to a user in a positive way, such as by a green light and/or a positive sound. A receipt may also be generated as a result of an allowed transaction. A non-allowed transaction may result in a negative indication, such as a red light and/or an error sound or an alarm. The guiding indication may be visually and/or audibly indicated to a user, e.g. a white light and/or a whistling sound.

The object is achieved according to a second aspect of the present disclosure by a storage arrangement also referred to as an inventory unit or guiding list, for handling one or more items in an item storage in a communication network. The storage arrangement further comprises a guiding unit configured to guide a user to a position related to an item by receiving a triggering action from a network node and/or the user. The storage arrangement comprises a detecting unit comprising a sensor configured to detect an indication of a pattern change of a registered pattern of the one or more items in the item storage, wherein the pattern change is due to a movement of the item associated with the position in the registered pattern.

The item storage may be a enclosed space in allocation where items are stored for commercial transactions, such as a container or a shelf in a retail store, a warehouse, a shelf system, a pick-up point and/or a vending machine. The communication network in which the item storage operates may comprise a back-end system having processing power and database storage capability for example for registering patterns of the one or more items using e.g. a machine learning model. The storage arrangement is arranged in a position of the item storage, such as mountable at a shelf or at a rack, and may comprise equipment for monitoring items on the shelf or rack. The guiding unit in the first state indicates to the user where an item may be picked up or dropped off. The sensor of the detecting unit may comprise a unit for distance measuring, e.g. by infra or radio frequency techniques, in order to detect movement and/or position of items in the item storage. The pattern may be determined optically by the detection of shapes or outlines and/or by distance measuring in predetermined positions, this may be learnt and retrieved from an ML model. The items may further be identified such as by optical pattern recognition or by RFID, etc. When the registered pattern changes, i.e. when an item is moved to or from a position, the pattern change is detected. The storage arrangement thus makes it possible to automate inventory stock based on a sensor solution which detects pick-up and drop-off of items performed by a user.

According to another aspect of the present disclosure, the storage arrangement may further comprise a triggering unit configured to initiate a procedure for handling one or more items in the item storage based on an input related to the user in the communication network. The communication network may comprise a back-end system having processing power and database storage capability. The triggering unit may thus initiate communication between the storage arrangement and the back-end system to retrieve user information, to receive information relating to a pending user transaction, to update item stock after a user transaction, etc.

According to another aspect of the present disclosure, the triggering unit may be a presence detection unit.

As described hereinabove, the storage arrangement may be activated triggered by the arrival of the user in the vicinity of the storage arrangement. The triggering unit in this case may detect the presence of the user and activate the storage arrangement.

According to another aspect of the present disclosure, the triggering unit may be a communications unit.

The communications unit may receive an incoming call or incoming communication from the communication network in response to input related to a user in the communication network. The input may be a result of the user selecting an item from a webpage or from an application, clicking on an button and/or providing log in information. The incoming call/communication may cause the triggering unit to initiate the procedure/method for handling the items in the item storage.

According to another aspect of the present disclosure, the guiding unit may be an optical unit and/or an audio output unit configured to output a confirmation output for confirming handling of the item back to the user. An allowed transaction may be visually and/or audibly indicated to a user in a positive way, such as by an optical green LED output indication and/or a by positive sound emitted as an audio output. A non-allowed transaction may result in a negative indication, such as a red LED indication and/or an error sound or an audible alarm. The guiding unit may also use LED symbols or text to guide the user.

According to another aspect of the present disclosure, the detecting unit may comprise a distance measurement unit. The distance measurement unit may register a pattern formed by items in the item storage. When an item is moved, the distance measured by the distance measurement unit changes. Consequently, the pattern shows a change in relation to the previously registered pattern and indicates that a transaction as taken place. The distance measurement unit may employ techniques such as optical or radio frequency, e.g. laser or radar techniques to measure distances to items.

According to another aspect of the present disclosure, the storage arrangement may be a ledge unit, a strip unit, a front unit, or a list, and the item storage may be a shelf or a shelf system, and wherein the ledge or the list may be arranged to be assembled with the shelf or mountable on the shelf.

The storage arrangement may be a fixture for holding the detecting unit, the guiding unit and/or the triggering unit. The storage arrangement may also be mountable or attachable to the item storage in question, for instance to be assembled with the shelf or with a rack. In case of a shelf, the storage arrangement may be configured as a list or a ledge which is assembled with the shelf such that the detecting unit may measure distances to items on the shelf and such that the guiding unit is visible and/or audible to the user. In larger item storages, such as retail stores or warehouses, multiple storage arrangements ma be used to handle the items in the item storage.

DESCRIPTION OF DRAWINGS

Further objects and advantages of, and features of the disclosure will be apparent from the following description of one or more embodiments, with reference to the appended drawings, where.

DETAILED DESCRIPTION

The present disclosure is developed in more detail below referring to the appended drawings which show examples of embodiments. The disclosure should not be viewed as limited to the described examples of embodiments, instead it is defined by the appended patent claims. Like numbers refer to like elements throughout the description.

Figure 1:
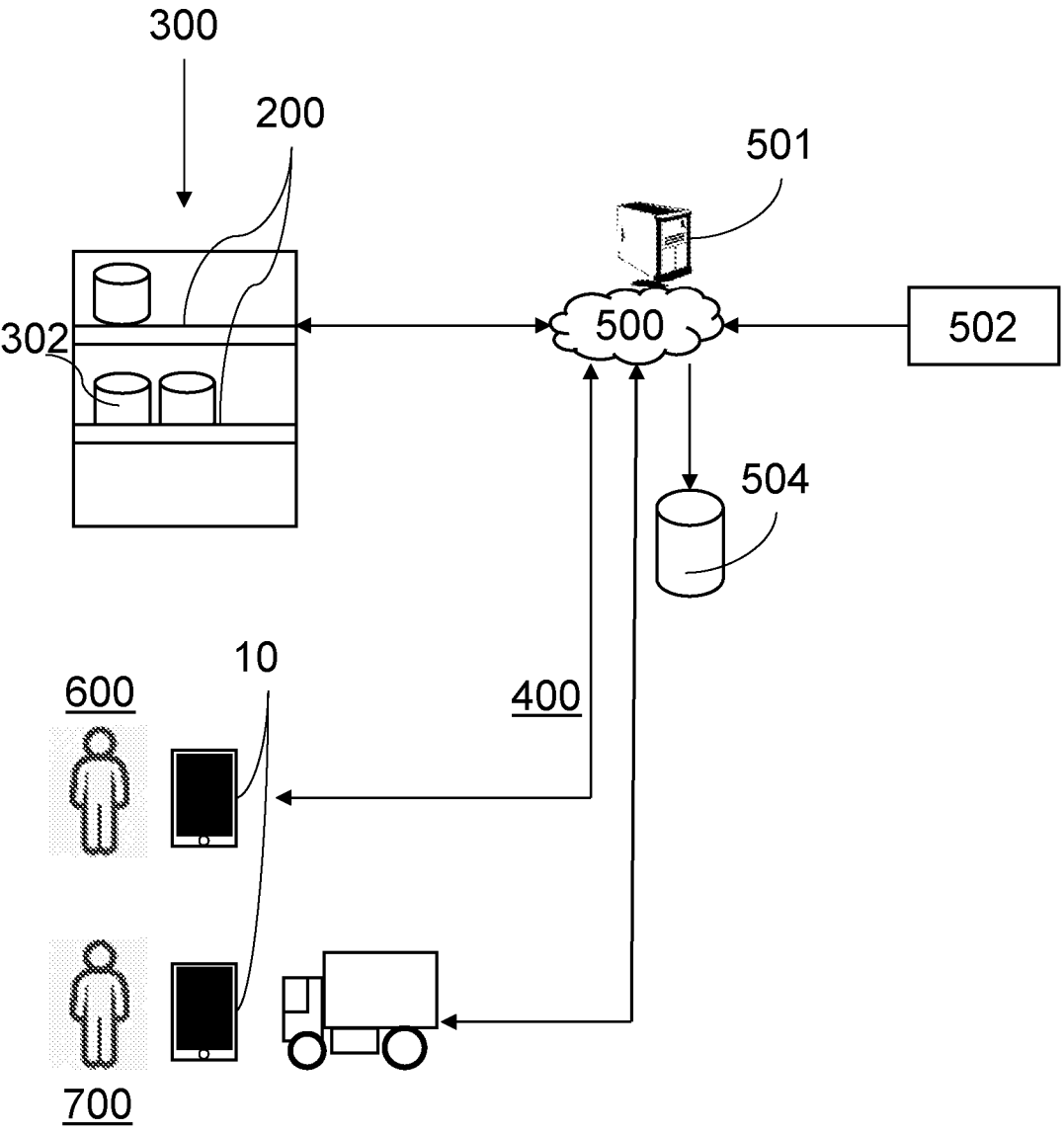
FIG. 1 shows a contextual overview of the present disclosure.

FIG. 1 shows a context of the present disclosure. An item storage 300, such as a retail store, a warehouse, a shelf system, a pick-up point and/or a vending machine, is connected to a communication network 400. The communication network 400 may be any kind of communication network such as a wired communication network or a wireless communication network comprising e.g. a radio access network (RAN) and a core network (CN). The communication network may serve one or more requesting nodes 10 such as user equipment (UE), e.g. users' communication devices, remote radio units, radio base stations, or similar. The communication network 400 may comprise back-end system, such as a cloud service 500, comprising one or more servers, providing processing capability, computer storage mediums, and servings as communications hub between the users (e.g. end users 600 and logistics services 700) and the item storage 300. Embodiments herein relate to procedures and systems for handling items, such as providing responses to incoming user requests, maintaining item stocks, guiding users, handling payments, etc, in item storages 300 connected to the communication network 400.

The item storage 300 comprises a storage arrangement 200, arranged to handle one or more items 302 in the item storage 300. The storage arrangement comprises a detecting unit 202, configured to keep track of the items 302 by registering a pattern formed by the items 302 in the items storage 300. The pattern may be captured by optical or radio frequency (rf) means, e.g. optical light emitters and sensors or RF emitters and sensors. The detecting unit 202 may for instance comprise LED or laser emitters and corresponding sensors, such that reflections of emitted wavelengths, e.g. infrared (IR), from the LED or laser may be detected by a sensor, whereupon a distance to an item may be measured. The distance measurements make up a pattern which may be registered. The pattern is defined to also include the possibility of an empty item storage 300. In this case, the distance measurements result in a pattern formed by the absence of items 302, i.e. the emitted wavelengths are reflected by boundaries of the item storage 300. The storage arrangement 200 further comprises a guiding unit 204. The guiding unit may be an optical (e.g. LED) and/or audio output unit configured to guide the user when handling the items 302 in the item storage 300.

A triggering unit 206 may further be provided to initiate procedures for handling the items 302 in the item storage 300 based on an input related to a user in the communication network. The input may relate to the user arriving in the vicinity of the item storage 300, or a signal from the cloud service 500 or from a UE 10.

The item storage 300 may use the communication network 400 to send and receive data and inventory sensor signals to and from the cloud service 500. The item storage 300 may further be enabled to control hardware comprised in the item storage 300, such as locks and/or doors.

The cloud service 500 may comprise a network node such as a server 501, a dashboard system 502 which handles and updates item storage status, storage arrangement status, sensor status, analytics and or statistics. The cloud service may further have an inventory database 504 containing data on article specifications (unique identifiers), article measurements, 2D or RFID tags, images, image processing tokens, item storage IDs, etc. The inventory database 504 may also comprise user data, such as identities, payment information and/or user authentication, access or restrictions.

The item storage 300 may communicate with end users 600 via the communication network 400 to provide the user with guidance as to where the user may find items 302 and item storages 300 and where specific items 302 may be found. Users may pay and/or accept billing, or receive refunds for returned items 302. The user may also be guided through the procedure and learn how to interact with the item storage 300. Furthermore, the status changes may be signaled to the user, such as changes relating to user interactions with the item storage 300.

The item storage 300 may similarly communicate with logistics services 700 via the communication network 400 to request resupply of the item storage, to update inventory status and/or to correct errors.

Interaction with the storage arrangement 200 of the item storage 300 may be conceptually exemplified by the following steps:

An end user (e.g. a consumer or buyer) searches for and requests an item 302 in an application. The user is guided to an item storage 300.

The user approaches the item storage 300 and consequently the storage arrangement 200.

The user is identified, such as via the application and/or BLE beacon, Internet of Things (IoT), or by other identification, e.g. through user interaction.

The user selects the item 302 in the application and pays and/or confirms the selected item.

The user is guided to the item 302, such as to a specific position on a shelf, via optical or audible means. The system may also guide a user who returns an item 302 by indicating an empty position, e.g. on a shelf.

The storage arrangement 200 detects interaction with the items 302 by pattern recognition.

The user receives feedback on the interaction by optical and/or audible signals.

Correctly performed interactions are registered and the inventory database is updated. Payments may be handled via the cloud service 500.

Figure 2:
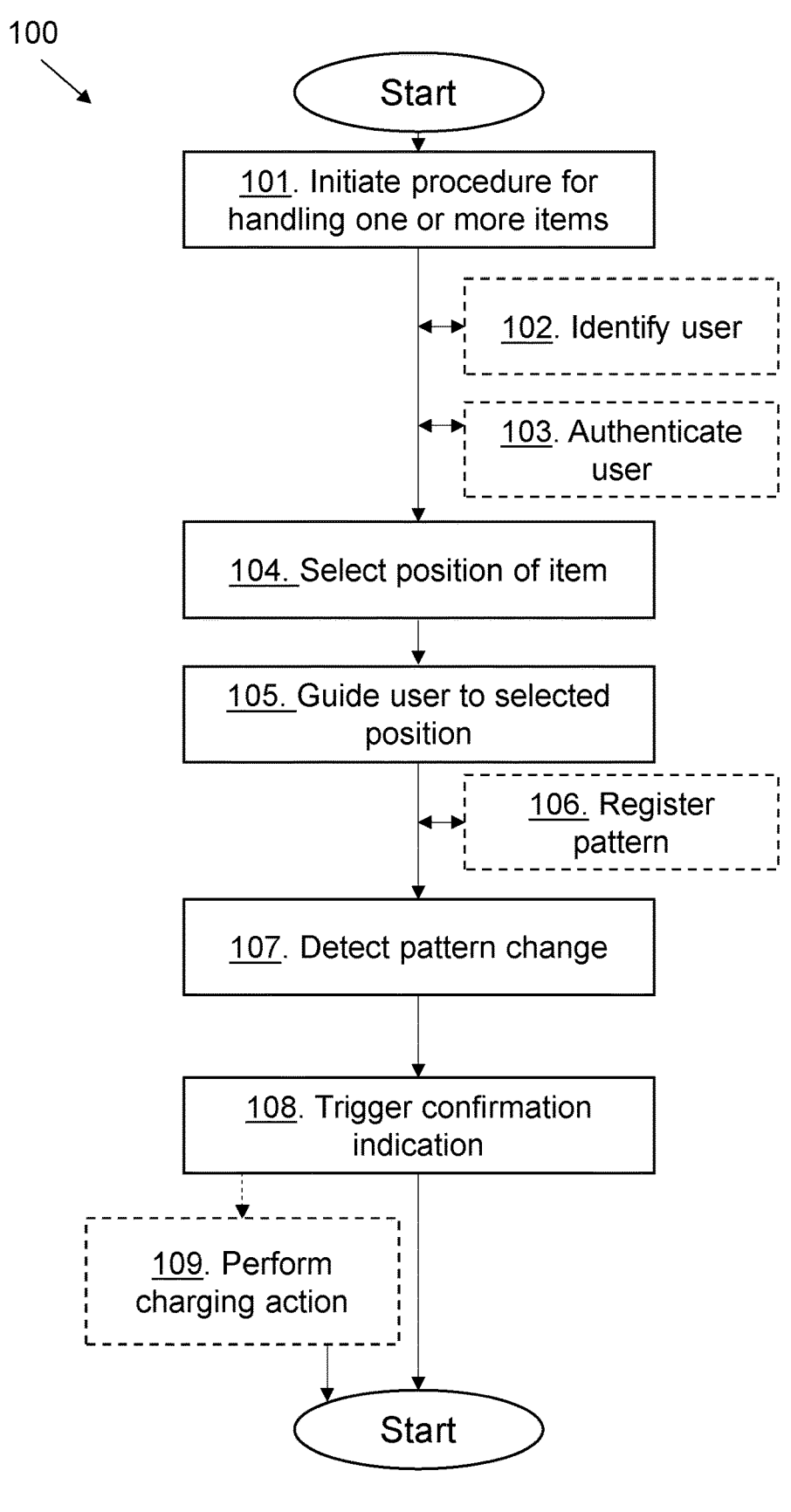
FIG. 2 shows a flowchart of a method according to a first aspect of the present disclosure.

FIG. 2 shows a flowchart of a method 100 according to embodiments that will now be described with reference to a flowchart depicted in FIG. 2. The actions do not have to be taken in the order stated below, but may be taken in any suitable order. Dashed boxes indicate optional features. The method 100 may be performed by the network node 501 for handling one or more items 302 in the item storage 300 in the communication network 400.

Action 101. The method comprises initiating 101 a procedure for handling one or more items in the item storage 300 based on an input related to a user in the communication network 400.

Action 102. The method may comprise identifying the user.

Action 103. The method may comprise authenticating the user.

Action 104. The method 100 further comprises selecting 104 the position related to the item 302 of the one or more items based on the input.

Action 105. The method 100 further comprises guiding 105 the user to the selected position via triggering the guiding indication to the first state associated with the selected position.

Action 106. The method may also comprise registering 106 a pattern of the one or more items 302 in the item storage 300. E.g. the positions of the one or more items are registered in a positions pattern that may be collected from the item storage and/or a server.

Action 107. The method comprises detecting 107 a pattern change of the registered pattern, wherein the pattern change is due to movement of an item 302 associated with the selected position.

Action 108. Furthermore, upon detection of the pattern change, the method comprises triggering 108 a confirmation indication for confirming handling of the item back to the user. The network node 501 may send the confirmation to the storage arrangement 200. The conformation indication may be positive confirmation or a negative confirmation.

Action 109. The method may comprise. upon a detection of the pattern change or sending the confirmation, performing a charging action associated with the user.

The user thus initiates the procedure, such as via an application, by e.g. selecting an item from a webpage, or by arriving in the vicinity of the storage arrangement 200. The user is thereafter guided, via the guiding indication in the first state, to the position where an item 302 which has been selected is to be picked up or dropped off. As the user interacts with the indicated item 302, the method detects a change in a previously registered pattern of positions and thereafter sends a confirmation to the user whether the transaction is accepted or not. Thereby, the method makes it possible to automate inventory stock based on a sensor solution which detects pick-up and drop-off of items performed by a user.

Where the triggering input of the user is the arrival of the user in the vicinity of the storage arrangement 200, a suitable range for the initiating step may be as the user arriving within 0.5 meters from the storage arrangement 200. Thereby, triggering/initiating resulting from users accidentally approaching the storage arrangement 200 is avoided in most cases, even in densely populated spaces, such as bus stops and train stations. As mentioned above, the storage arrangement 200 may comprise equipment for detecting users via radio frequency (e.g. radar), card detection, radio frequency identity (RFID), and/or via a beacon such as BLE/IoT.

In conjunction with the initiation step, the user may also be identified 106, such as via the user's application, BLE notification (e.g. IoT beacon), or other identification such as via user interaction, e.g. user input of ID and/or password.

When the user has been identified, the user may be authenticated to determine the level of access of the user and what type of interaction is allowed on behalf of the user. A consumer may for instance only be allowed to pick up and drop off items and to conduct financial transaction, whereas logistics staff may also be allowed to re-stock the item storage 300, to correct errors, to update the dashboard 502 and/or update the inventory database 504 of the cloud service 500.

The detection of the pattern change may be related to distance measurement performed by an optical detection, a radio frequency (RF) detection, radar detection or similar. It may also relate to optical pattern recognition, e.g. image recognition as compared to data from an image database. The pattern is a pattern formed by the items—or lack of items—in the item storage. The pattern may be registered by way of distance measurement performed by an optical detection, a RF detection, a radar detection or similar. Different items, arranged in different configurations form the pattern which is registered. If the pattern changes due to pick-up or drop-off of items, the pattern formed by the items will change and the change may be detected by any of the techniques mentioned, or by other suitable techniques known in the art. When the pattern change is detected, the change may determine what item was picked up or dropped off. This information is compared with user data and inventory data to determine that the transaction was allowed, e.g. that the item corresponds to the user and that the user has requested the item and/or that he or she is authorized to make a transaction with the item. Fraudulent or non-authorized behavior of a user may thus be detected.

The technique for registering the pattern and the pattern change may be used to determine whether an item was picked up or dropped off, such as by determining if a space in the item storage has become empty, or if an item has been placed in an empty space. The action may also be predetermined in that the user has previously requested to pick up or drop off an item. If the user does not comply with the previous request, the guiding indication in the second state may be a negative indication.

Upon detection of a transaction via the pattern change and upon determining the identity and authentication of the user, and correctness of the transaction (correct pick-up or drop-off), a charging action may be performed, in which the user pays for the transaction. In other situations, the user may be paid, or refunded, for the transaction, such as when returning an item. The charging action may be performed, for instance using payment information that the user has previously registered in the inventory database 504, i.e. with the provider of the item storage or via a card or a handheld unit carried by the user.

Upon triggering the confirmation indication the guiding indication is triggered to the second state. The second state of the guiding indication informs the user whether the transaction was accepted/allowed or not. An allowed transaction may be visually and/or audibly indicated to a user in a positive way, such as by a green light and/or a positive sound. A receipt may also be generated as a result of an allowed transaction. A non-allowed transaction may result in a negative indication, such as a red light and/or an error sound or an alarm, and/or the locking of a door.

Thus, embodiments herein automate real time inventory of goods placed on shelves e.g. in 1. warehouses,
2. retail stores and or
3. in remote vending machines/cabinets with remote controlled locks e.g. in outdoor environments. In remote out door environments the back end system provides api's for search in a system/app for an item and the system respond with where a self-service shelfs/cabinets are located and in which cabinets/vending machines the item is available.

The system makes it possible to automate inventory stock values based on a sensor solution that easily can be fitted on existing shelves.

The back end system can commit transactions and automatically update an inventory of what an end user has picked up in a retail store, a cabinet outdoor and or grocery store.

The inventory can be presented in an interactive interface such as a screen on a machine, in an end users app and in the back end interfaces.

The back end can commit a e-commerce transaction and withdraw the amount from an appropriate payment solution.

The system makes it possible to establish sores without personnel and control inventory remote pick up places for e-commerce goods etc.

The system may comprise

1. The storage arrangement 200 such as a Sensor list, mounted on the shelf, detecting movements (and identity using sensor options) of items on shelves, pick and drop
   a. The sensor list may include several sensors and alerting equipment
   i. Optical LED indications built into the list
   ii. Sound speakers that plays sounds (good—bad sound) to make and end user aware of what to do and if he/she makes a mistake.

2. An internet of thing gateway (IoT gw)—a wireless gateway that may preprocess the sensor list data and relays the information back to the back end system in real time.
   a. Today we use 4 g transmission, but 5 g wireless transmissions will improve the overall usage and performance with less latency
3. The network node 501 such as a Back end inventory system (database and business logic) that keeps tracks of movements and calculates current positions and inventory.
   a. With sensor list with video option it also interpreters images from the camera identifying items using image recognition and artificial intelligence (AI) algorithms
   b. With sensor list with 3D radar—also calculates 3D mathematical images of the situation that makes it possible to mix items more.
   c. Learn good and bad patterns using AI, i.e. using sensor data as input to learn whether an item has been picked up or not, or if a different erroneous item has been dropped off.

The sensor list may be fitted with a number of sensors.
Minimum equipment is a standard distance unit (Infra or Radar)
Advanced 3d radar with triangulation
Video camera
RFID sensor
LED for status codes
Speaker for stats codes The sensor list may be wired and/or use wireless communication to the gateway. The sensor list may also have inbuilt processor to make quick calculations and image matching.

The Process Flow According to an Exemplary Embodiment

1. Guide the user to the correct place—shelf (map, path finding, routing, address etc.), Actions 104 and 105 above.
2. Identify the user at the location (near field communication (NFC), Positioning, BLE Beacon etc.) Action 102 above.
   a. Or via other ID/payment solution when unlocking/getting access to the shelf. For example, use bank ID and/or Swish.
3. Use optical lights in the shelf to get the users attention very fast. Action 105 above.
4. Use sensors to detect that the correct items was taken from the correct row/place. Action 107 above.
5. Perform application transactions (payment and or other user commit). Action 109 above.
6. Give the user real time feedback optically via the lights and sound (e.g. showing green or red on the shelf). Action 108 above.
7. Guide the user in an app if something is not understandable and or needs to be corrected and or verified.
8. Use machine learning and AI to learn normal patterns and behavior. Also complement with AI using video/image processing that detects the correct item was taken as a double check (e.g. if RFID is not used at the items). See action 106 above.

Figure 3:
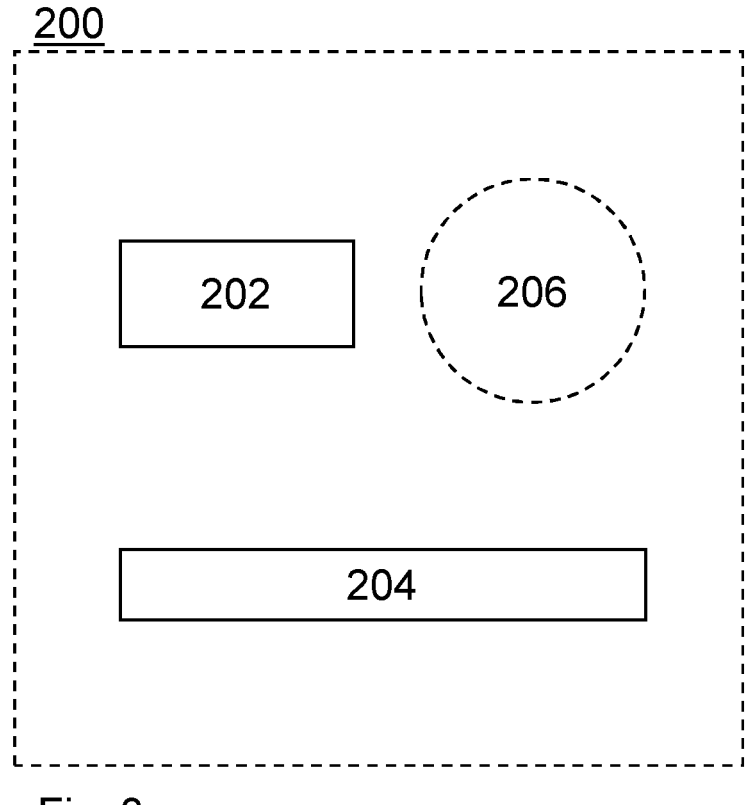
FIG. 3 is a schematic representation of a storage arrangement according to a second aspect of the present disclosure.

FIG. 3 shows a schematic representation of the storage arrangement 200 for handling the one or more items 302 in the item storage 300 in the communication network 400. As disclosed hereinabove, the storage arrangement 200 comprises a detecting unit 202 comprising a sensor configured to assign a unique position to an item 302 and to register a pattern of the one or more items 302 in the item storage 300 and to detect a pattern change in the registered pattern, wherein the pattern change is due to movement of the item 302 associated with the position. The storage arrangement further comprises the guiding unit 204 configured to guide a user to the position related to the item 302 by receiving a triggering action from a network node or the user.

As mentioned before, the item storage 300 may be a stores, cabinet, enclosure of a location where items are stored for commercial transactions, such as a retail store, a warehouse, a shelf system, a pick-up point and/or a vending machine. The communication network 400 to which the item storage 300 is connected may comprise a back-end system, e.g. comprising the cloud service 500 as described before, having processing power and communication and database storage capability. The storage arrangement 200 is positioned at the item storage, such as at a shelf or at a rack, and comprises sensor equipment for monitoring items on the shelf or rack. The guiding unit 204 may be an optical unit and/or audio output unit, such as a LED indicator(s) and a speaker(s). The guiding unit 204 may be configured to output a guiding output for confirming handling of the item back to the user. The guiding unit 204 may output a guiding indication in a first state and a second state. A guiding indication in the first state indicates to the user at what position of the item storage 300 an item 302 may be picked up or dropped off. A guiding indication in the second state is confirmation output which indicates to the user whether the item 302 has been handled correctly or not. A correct handling of an item 302 may be an "allowed" transaction, which may be visually and/or audibly indicated to the user in a positive way, such as by an optical green LED output indication and/or by a positive sound emitted as an audio output. An incorrect handling of the item may be a "non-allowed" transaction, which may result in a negative indication, such as a red LED indication and/or an error sound or an audible alarm. The guiding unit may also use LED symbols or text to guide the user.

The sensor of the detecting 202 unit may comprise a distance measurement unit for distance measuring, e.g. by infra or radio frequency techniques, configured to assign unique positions to items 302 in the item storage 300. The pattern may be determined optically by the detection of shapes or outlines of the items 302 and/or by distance measurement in predetermined positions. The items 302 may further be identified such as by optical pattern recognition or by RFID, etc. When the registered pattern changes, i.e. when an item 302 is moved to or from a position, a pattern change is detected because the distance measurement unit measures a change in distance to the item(s) 302. The storage arrangement 200 thus makes it possible to automate inventory stock based on a sensor solution which detects pick-up and drop-off of items performed by a user. An exemplary way of assigning positions to items 302 will be described further below.

A triggering unit 206 may also be comprised in the storage arrangement 200. The triggering unit 206 is configured to initiate the procedure/method 100 for handling the one or more items 302 in the item storage 300 based on the input related to the user in the communication network 400. The triggering unit 206 may thus initiate communication between the storage arrangement 200 and the back-end system (e.g. the cloud service 500) to retrieve user information, to receive information relating to a pending user transaction, to update item stock after a user transaction, etc. The triggering unit 206 may be a presence detection unit. The presence detection unit is configured to detect the presence of the user in the vicinity of the storage arrangement 200 and activate the storage arrangement.

Alternatively, the triggering unit 206 may comprise a communications unit. The communications unit may receive an incoming call from the communication network 400 in response to the input produced by the user in the communication network 400. The input may be a result of the user selecting an item 302 from a webpage or from an application, e.g. an API. The incoming call may cause the triggering unit 206 to initiate the procedure/method 100 for handling the items 302 in the item storage 300.

Figure 4:
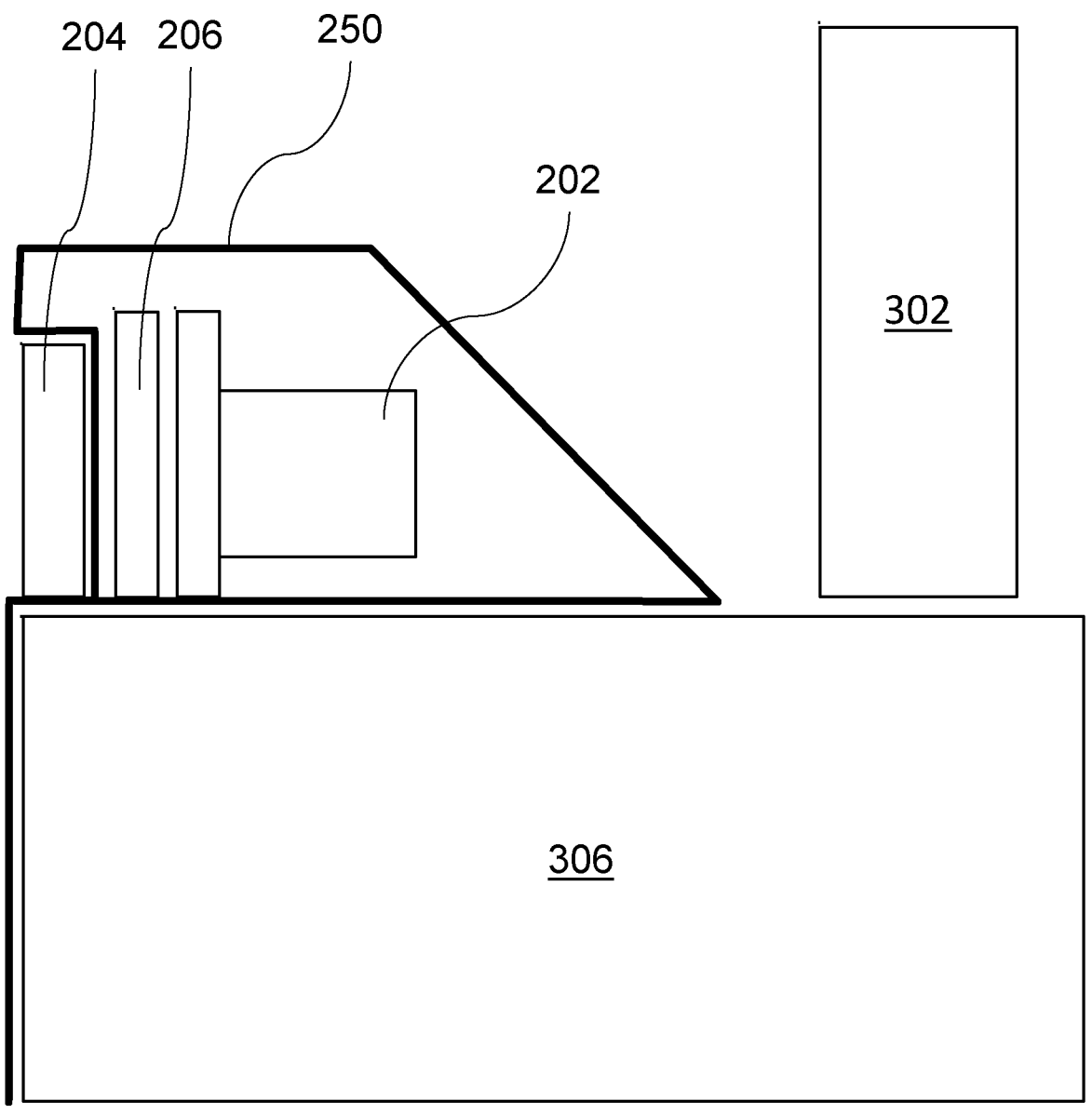
FIG. 4 shows a side-view of an exemplary storage arrangement according to the present disclosure.

In a further, non-limiting example, the storage arrangement 200 is described as a ledge or a list 250, as shown in FIG. 4, and the item storage 300 is a shelf 306, and wherein the ledge or the list 250 is arranged to be assembled with the shelf 306. FIG. 4 illustrates a side-view of the storage arrangement 200 exemplified as the ledge or list 250, hereinafter simply referred to as the list 250.

The storage arrangement 200 may be configured as a fixture for holding the detecting unit 202, the guiding unit 204 and the triggering unit 206. The storage arrangement 200 may also be mountable or attachable to the item storage 300 in question, for instance to be assembled with a shelf 306 or with a rack. Such a fixture may for instance be designed as the list 250 shown in FIG. 4. The list 250 is assembled with the shelf 306 such that the detecting unit 202 may measure distances to items 302 on the shelf 306 and such that the guiding unit 204 is visible and/or audible to the user. In larger item storages, such as retail stores or warehouses, multiple storage arrangements 200 (e.g. lists 250) are used to handle the items 302 in the item storage 300. In other words, each shelf 306 of an item storage 300 may have a list 250 for monitoring the items 302 on the shelf 306.

The detecting unit 202 comprises equipment for monitoring the items 302 and for registering the pattern of the shelf 306. The detecting unit 202 may comprise a distance measurement unit, such as a radar or optical emitter/receiver, e.g. radiofrequency or infrared wavelength equipment. Alternatively, the detecting unit 202 may comprise a 3D radar for pattern detection. The detecting unit may also comprise a RFID sensor/reader or video/image processing equipment for identifying the items 302 on the shelf. When an item 302 is moved past the list 250, the RFID reader may register interaction with the specific item. The item 302 may also be identified by image processing via a camera and machine learning or image pattern recognition.

Each shelf can be equipped with the storage arrangement 200 also referred to as the list or sensor list. The list may be equipped with sensors that can sense the items on each shelf and also to interact with the end-user using optical lightning, blinking, sequences. A LED list is mounted in the inventory list (see below) or at the shelfs front side.

The Shelf and Sensors

A standard shelf can easily be retrofitted/equipped with the list including all sensors and tech needed to make a shelf online and communicate with the inventory cloud solution (or via e.g. an IoT GW) and interact with the end user using optical sequences, colors and sometimes complemented with sounds.

The shelf may be divided into rows with a width that reflects the items/goods dimension.

Each cabinet with shelf gets an ID and row numbers. A front list with LED lights and a sensor for measure distances each row are mounted on each shelf.

The item storage such as A cabinet/self-standing shelf can also be equipped with a flashing alarm light and a speaker that can inform the end user very clearly that he or she did something wrong, e.g. took the an item from the wrong row.

Figure 5:
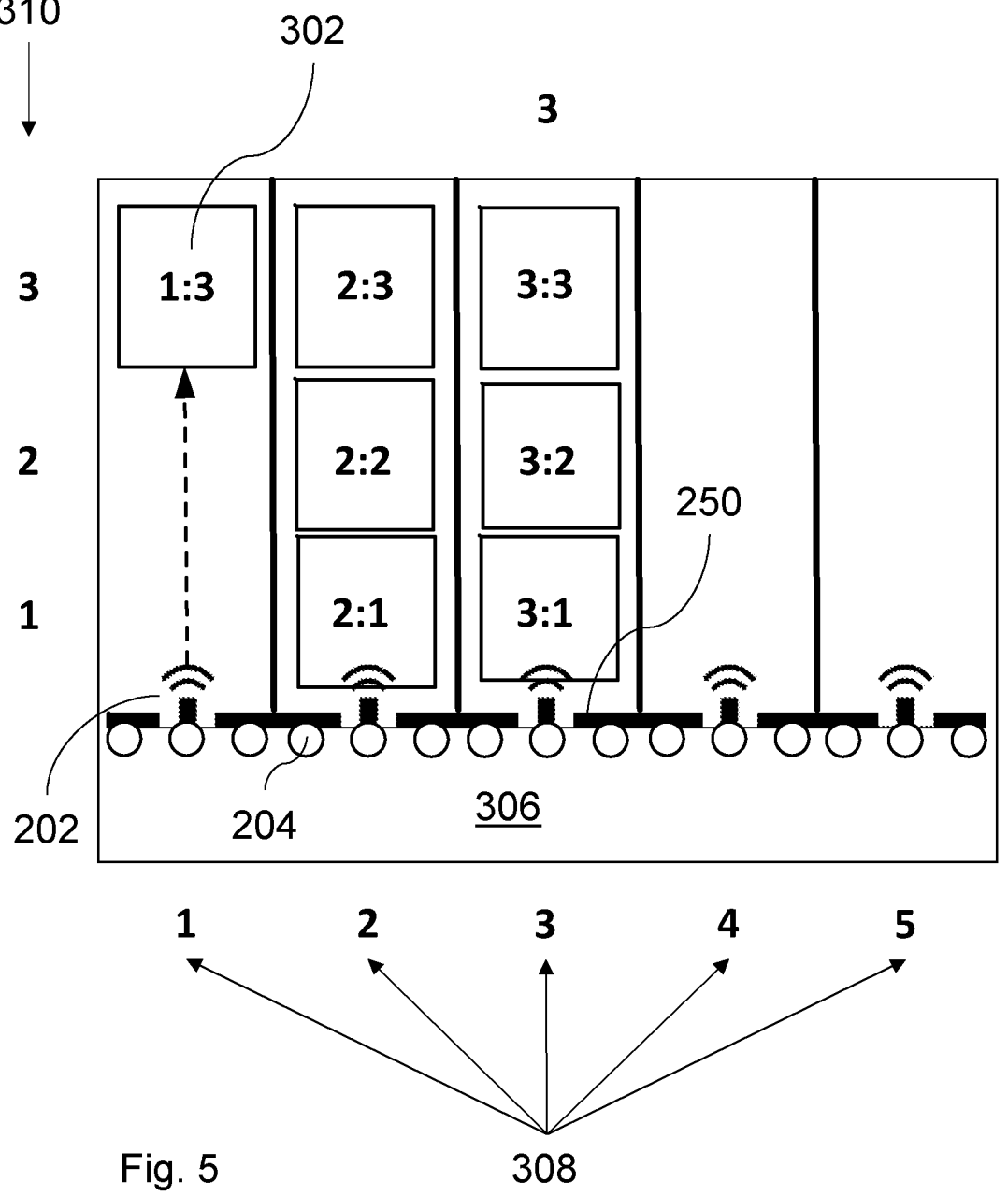
FIG. 5 shows a top-down view of an exemplary item storage of the present disclosure.

FIG. 5 illustrates a list 250 comprising multiple detecting units 202 for keeping track of e.g. multiple rows 308 of items 302 on the same shelf. The list 250 may also comprise multiple guiding units 204 to indicate different rows on the same shelf 302. The guiding units 204 may for instance comprise multiple LED indicators capable of displaying different colours and/or light sequences, such as flashing patterns, etc.

The shelf may comprise at least one row 308. The rows may be physically separated from each other. A detecting unit 202 may be arranged at each row 308. The shelf may further comprise at least one line 310. The lines may be defined by predetermined distances from the detecting units 202. The detecting units 202 may thus assign unique positions to each item 302 by distance measurement. For instance, depending on the distance from a detecting unit in row 1, to an item 302, the position of that item 302 may be determined to be in e.g. the first line 310. As exemplified in FIG. 5, the item is assigned the unique position 1:3. In the second row 308 the items may be assigned the positions 2:1, 2:2 and 2:3 and so on, depending on the distance measured by the detecting unit 202 arranged at the second row 308.

Interaction with the storage arrangement 200 of the item storage 300 may then be exemplified by the following steps:

The user (e.g. a consumer or buyer) searches for and requests an item 302 in an application. The user is guided to an item storage 300, such as a warehouse having shelves 306.

The user approaches the item storage 300, e.g. the shelf 306 and consequently the list 250.

The user is identified, such as via the application and/or BLE beacon, Internet of Things (IoT) communication, or by other identification, e.g. through user interaction, login at a computer terminal, etc.

The user selects the item 302 in the application and pays and/or confirms the selected item.

The user is guided to the item 302 at a certain position, such as 2:1, by LED indicators and/or audible sound of the guiding unit 204 in the second row 308. The system may also guide a user who returns an item 302 by indicating an empty position, such as on the fifth row 308.

The detecting unit 204 detects interaction with the items 302 by pattern recognition, i.e. by detecting a new measured distance in a row 308.

The user receives feedback on the interaction by optical and/or audible signals.

Correctly performed interactions are registered and the inventory database is updated. Payments may be handled via the cloud service 500.

An Exemplary Scenario

A) The user is identified and has payed or accepted terms for taking an item.

B) The cloud system knows that the item is in row 2. Next in place is 1:3.

1. The cloud system lights up row 1. Flashing white.

2. The end user app shows a picture that he/she shall take the 1:3 item.

3. When the user takes 1:3, the optical distance sensor measures the changed distance and sends a control signal to the cloud.

a. The cloud responds and sends green light/check to app b. The LED flashes green and then constant green as OK c. The cloud changes inventory value and transaction is done.

4. IF the end user takes 2:1 a. The LED will FLASH RED b. The end users app may VIBRATE and tell RED/NOT OK c. The alarm light and sound can be started at the section/in a cabinet.

5. If item is put back 2:1 a. The row 1 flashes white again and the end user can restart

The rows may this be divided into numbers with positions (e.g. 1:3) that are defined into a cloud database. Depending on storage arrangement with its specification (measurements, image etc.) the distance will tell the system how many items that are left and also be able to change inventory when the distance is changed.

Figure 6:
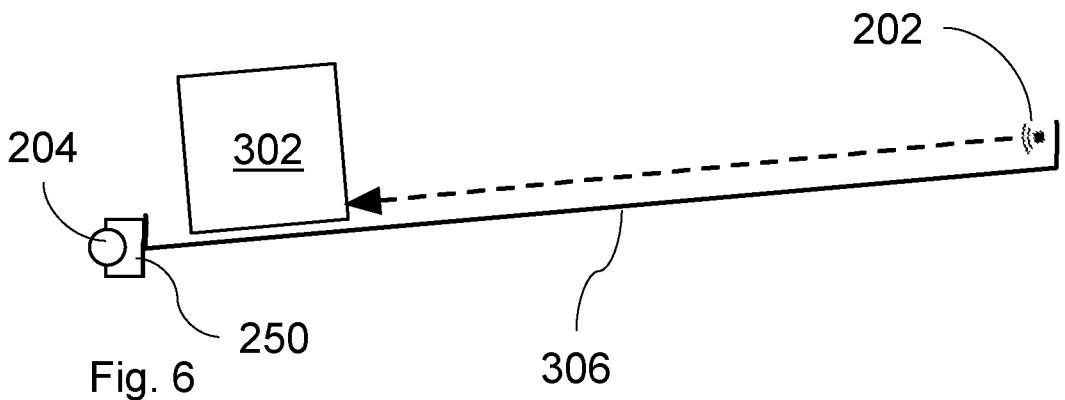
FIG. 6 shows a side-view of an exemplary embodiment of the present disclosure.

In an item storage 300, e.g. shelf 306, where items 302 are automatically moved to the front of the shelf 306, such as by a slanting shelf 306 or by being urged forward by a spring, the detecting units 202 may be arranged behind the items 302, such as illustrated in FIG. 6. Thereby, the pattern may still be registered by the detecting units 202 by distance measurements. Simple mounting—1D measurement. The optical sensor can measure the distance to the items in each row. Either the shelf/and row is equipped with the optical sensor in the back or in the front or both depending on application. If the shelf is placed in a manner that the items fall to the front, the sensor may be placed in the back of each row.

Figure 7:
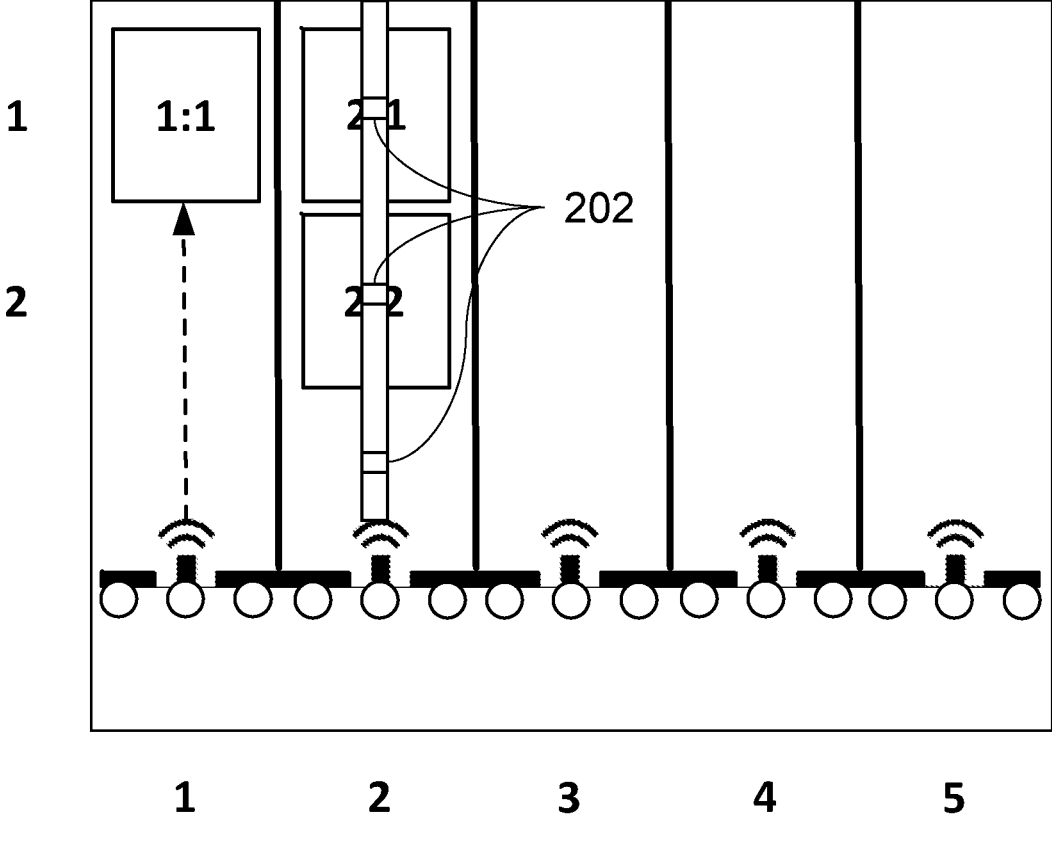
FIG. 7 shows a top-down view of a further exemplary embodiment of the present disclosure.

It is also possible to use 3D measurements by arranging further detecting units 202 to measure vertical distances in each position. FIG. 7 is similar to the example illustrated in FIG. 5. In addition, "vertical" detecting units 202 have been arranged above the items 302. FIG. 7 only shows vertical detecting units 202 in the second row, but they may obviously be similarly arranged along all the rows. The detecting units 202 measuring vertical distances are thereby able to measure distances in positions that are obscured by the "horizontal" detecting units 202 at the front of the shelf. Heights of items 302 may thus also be measured and the height measurements may be used to identify items in case of mixed items on the shelf. The solution can be extended with an integrated RFID reader in the storage arrangement. The reader can then also detect the specific item passing by the storage arrangement. Reader is triggered by the optical sensor sensing that an item is moved from the row.

Video/Image Processing

A small video camera can also be triggered and using AI/machine learning/image pattern recognition identify the item that pass by the storage arrangement when the optical sensor triggers that images shall be taken and processed. With 5 g networks the back end system can make the processing due to the low latency of the network.

Cloud Inventory Calculations.

Each shelf may be configured with a unique Location ID in a store or cabinet etc. The shelf is divided into rows and positions so each inventory place gets an unique identifier. In this example above e.g. #Shelf ID, placeholder 1:3.

Sensor Data to Cloud and Inventory Updates

The storage arrangement 200 may send via a network e.g. IoT GW/Connectivity changes in distances from each row. When an item is picked up and or placed at the shelf the distance will change. Depending on configured items (article no from e.g. an ERP) dimensions in depth the inventory value can be updated upon each change.

The method according to the embodiments described herein for the storage arrangement 200 may be implemented by means of e.g. a computer program product 600 or a computer program, comprising instructions, i.e., software code portions, which, when executed on at least one processor, cause the at least one processor to carry out the actions described herein, as performed by the network node, system and storage arrangement 200, respectively. The computer program 600 may be stored on a computer-readable storage medium 700, e.g. a universal serial bus (USB) stick, a disc or similar. The computer-readable storage medium 700, having stored thereon the computer program product, may comprise the instructions which, when executed on at least one processor, cause the at least one processor to carry out the actions described herein, as performed by the network node, system and storage arrangement 200, respectively. In some embodiments, the computer-readable storage medium may be a non-transitory computer-readable storage medium.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the claims of this disclosure. Although specific terms may be employed herein, they are used in a generic and descriptive sense only and not for purposes of limitation.

The invention claimed is:

1. A method performed by a storage arrangement for handling one or more items in an item storage in a communication network, the storage arrangement being a ledge unit comprising multiple guiding units arranged to be mountable on a shelf, the method comprising:

initiating a procedure for handling one or more items in an item storage based on an input related to a user in the communication network, the input being detection of a presence of the user, the presence being detected by one or more of: radar, card detection, radio frequency identification, RFID, and a beacon;

selecting one or more positions related to the one or more items based on the input;

guiding the user to a selected position via triggering a guiding indication associated with the selected position by one or both of a light emitting diode, LED, indicator and an audible sound indicator arranged at the storage arrangement to indicate a row of items configured for guiding the user to return an item by indicating an empty position;

guiding the user to another selected position via triggering a guiding indication associated with the other selected position by one or both of another LED indicator and an another audible sound indicator arranged at the storage arrangement to indicate another row of items configured for guiding the user to pick up a pickup item;

detecting a pattern change of a registered pattern related to the one or more items in the item storage, the pattern change being due to one of a movement of the item related to the selected position and movement of another item of the one or more items, detecting the pattern change being related to distance measurement to the item performed by an optical detection, a radio frequency detection, or a radar detection, and the detecting the pattern change comprising an additional detection for confirming that the item is a correct item or not that is returned and that the pickup item is a correct item or not that is picked up, and detecting the pattern change comprising detecting the pickup of the pickup item and the return of the item; and upon detection of the pattern change, triggering a confirmation indication for confirming handling of the item back to the user.

2. The method according to claim 1, further comprising identifying the user.

3. The method according to claim 1, further comprising authenticating the user.

4. The method according to claim 1, further comprising performing a charging action associated with the user.

5. The method according to claim 1, wherein triggering the confirmation indication comprises triggering the guiding indication to a second state.

6. The method according to claim 1, further comprising one of identifying and authenticating the user.

7. A network node comprising processing circuitry configured to:

initiate a procedure for handling one or more items in an item storage based on an input related to a user in a communication network, the input being detection of a presence of the user, the presence being detected by one or more of: radar, card detection, radio frequency identification, RFID, and a beacon;

select one or more positions related to the one or more items based on the input;

guide the user to a selected position via triggering a guiding indication associated with the selected position by one or both of a light emitting diode, LED, indicator and an audible sound indicator arranged at the storage arrangement to indicate a row of items configured for guiding the user to return an item by indicating an empty position;

guide the user to another selected position via triggering a guiding indication associated with the other selected position by one or both of another LED indicator and an another audible sound indicator arranged at the storage arrangement to indicate another row of items configured for guiding the user to pick up a pickup item;

detect a pattern change of a registered pattern related to the one or more items in the item storage, the pattern change being due to one of a movement of the item related to the selected position and movement of another item of the one or more items, detecting the pattern change being related to distance measurement to the item performed by an optical detection, a radio frequency detection, or a radar detection, and the detecting the pattern change comprising an additional detection for confirming that the item is a correct item or not that is returned and that the pickup item is a correct item or not that is picked up, and detecting the pattern change comprising detecting the pickup of the pickup item and the return of the item; and upon detection of the pattern change, trigger a confirmation indication for confirming handling of the item back to the user.

8. A storage arrangement for handling one or more items in an item storage in a communication network; the storage arrangement being a ledge unit comprising multiple guiding units arranged to be mountable on a shelf, the storage arrangement comprising a processor configured to:

initiate a procedure for handling one or more items in an item storage based on an input related to a user in the communication network, the input being detection of a presence of the user, the presence being detected by one or more of: radar, card detection, radio frequency identification, RFID, and a beacon;

a processor configured to:

guide a user to a position associated with an item by receiving a triggering action from a network node or the user by one or both of a light emitting diode, LED, indicator and an audible sound indicator arranged at the storage arrangement to indicate a row of items configured for guiding the user to return an item by indicating an empty position; and guide the user to another selected position via triggering a guiding indication associated with the other selected position by one or both of another LED indicator and an another audible sound indicator arranged at the storage arrangement to indicate another row of items configured for guiding the user to pick up a pickup item; and a sensor configured to detect an indication of a pattern change of a registered pattern of the one or more items in the item storage, the pattern change being due to a movement of the item associated with one of the position and another item of the one or more items, detecting the indication of the pattern change being related to distance measurement to the item performed by an optical detection, a radio frequency detection, or a radar detection, and the detecting the pattern change comprising an additional detection for confirming that the item is a correct item or not that is returned and that the pickup item is a correct item or not that is picked up, and detecting the pattern change comprising detecting the pickup of the pickup item and the return of the item.

9. The storage arrangement according to claim 8, further comprising a distance measurement unit.

10. The storage arrangement according to claim 8, wherein the storage arrangement is one of a ledge and a ledge unit, and the item storage is a shelf, and wherein the one of the ledge and the ledge unit is arranged configured to be one of assembled with, and be mountable on, the shelf.

* * * * *